US008082512B2

(12) United States Patent
Gedye et al.

(10) Patent No.: US 8,082,512 B2
(45) Date of Patent: Dec. 20, 2011

(54) FRACTAL DISPLAY ADVERTISING ON COMPUTER-DRIVEN SCREENS

(75) Inventors: David M. Gedye, Seattle, WA (US); Blaise H. Aguera Y Arcas, Seattle, WA (US); Alfred Astort, Seattle, WA (US); Karim T. Farouki, Seattle, WA (US); Gary W. Flake, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/833,780

(22) Filed: Aug. 3, 2007

(65) Prior Publication Data

US 2009/0037838 A1    Feb. 5, 2009

(51) Int. Cl.
*G06F 3/048* (2006.01)
(52) U.S. Cl. ........................ 715/767; 715/777
(58) Field of Classification Search .................. 715/767, 715/777
See application file for complete search history.

(56) References Cited

U.S. PATENT DOCUMENTS

| | | | | |
|---|---|---|---|---|
| 5,105,184 A * | 4/1992 | Pirani et al. | ................... | 345/629 |
| 5,341,466 A | 8/1994 | Perlin | | |
| 6,034,661 A | 3/2000 | Servan-Scheiber | | |
| 6,850,260 B1 * | 2/2005 | Taylor | ............................ | 715/835 |
| 7,038,701 B2 | 5/2006 | Niemi | | |
| 7,039,872 B1 * | 5/2006 | Raheman | ...................... | 715/748 |
| 7,133,054 B2 | 11/2006 | Aguera y Arcas | | |
| 7,190,839 B1 | 3/2007 | Feather | | |
| 7,197,718 B1 * | 3/2007 | Westerman et al. | .......... | 715/801 |
| 7,219,309 B2 * | 5/2007 | Kaasila et al. | ................ | 715/800 |
| 7,260,789 B2 * | 8/2007 | Hunleth et al. | ............... | 715/858 |
| 7,386,806 B2 * | 6/2008 | Wroblewski | .................. | 715/788 |
| 7,568,166 B2 * | 7/2009 | Kato | ............................. | 715/784 |
| 7,634,723 B2 * | 12/2009 | Layzell | ......................... | 715/243 |
| 7,707,503 B2 * | 4/2010 | Good et al. | .................... | 715/732 |
| 7,984,386 B1 * | 7/2011 | Zuverink | ...................... | 715/800 |
| 2003/0204367 A1 * | 10/2003 | Hartigan et al. | .............. | 702/178 |
| 2005/0116966 A1 | 6/2005 | Graham | | |
| 2005/0210399 A1 * | 9/2005 | Filner et al. | .................... | 715/767 |
| 2006/0059225 A1 * | 3/2006 | Stonehocker et al. | ........ | 709/202 |
| 2006/0200308 A1 * | 9/2006 | Arutunian | ..................... | 701/208 |
| 2006/0241859 A1 | 10/2006 | Kimchi | | |
| 2006/0277477 A1 * | 12/2006 | Christenson | .................. | 715/760 |
| 2007/0003152 A1 | 1/2007 | Hoppe | | |
| 2007/0265923 A1 * | 11/2007 | Krassner et al. | ................ | 705/14 |

(Continued)

OTHER PUBLICATIONS

Maria Langer, Mac OS X: Visual QuickStart Guide, Peachpit Press, Pub. Date Apr. 18, 2001, Chapter 3 File Mangement, "Views" (p. 1-15 of attached).*

(Continued)

*Primary Examiner* — William Bashore
*Assistant Examiner* — David Phantana Angkool
(74) *Attorney, Agent, or Firm* — Shook Hardy & Bacon LLP

(57) ABSTRACT

Techniques are disclosed for providing additional data within a document. Such techniques include providing a first document with a sub-region on a user interface, wherein the sub-region is associated with additional data. Techniques further include identifying an action to zoom-in on the sub-region and loading a zoomed-in version of the sub-region when the action is identified. Moreover, the techniques also include displaying the zoomed-in version of the sub-region, including the additional data, on the user interface, wherein the zoomed-in version of the sub-region is a separate document than the first document.

19 Claims, 6 Drawing Sheets

U.S. PATENT DOCUMENTS

| | | | |
|---|---|---|---|
| 2008/0052629 A1* | 2/2008 | Phillips et al. | 715/736 |
| 2008/0201655 A1* | 8/2008 | Borchardt et al. | 715/767 |
| 2009/0037838 A1* | 2/2009 | Gedye et al. | 715/777 |
| 2009/0138826 A1* | 5/2009 | Barros | 715/841 |
| 2009/0177538 A1* | 7/2009 | Brewer et al. | 705/14 |
| 2010/0017733 A1* | 1/2010 | Barros | 715/766 |
| 2010/0082709 A1* | 4/2010 | Yamamoto | 707/812 |
| 2010/0211515 A1* | 8/2010 | Woodings et al. | 705/320 |

OTHER PUBLICATIONS

TNTserverTM 2007:73, http://www.microimages.com/products/tntserver.htm, May 9, 2007.

Raster Conceptual Design for the PAMAP Program, Advanced Technology Solutions, http://www.dcnr.state.pa.us/topogeo/pamap/consdesignfinal.pdf, Dec. 20, 2005.

Seadragon, http://labs.live.com/Seadragon.aspx, May 9, 2007.

* cited by examiner

US 8,082,512 B2

FRACTAL DISPLAY ADVERTISING ON COMPUTER-DRIVEN SCREENS

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Today, advertising on the Web currently consists of two broad classes: display ads and text ads. Display ads typically have graphic designs and occupy a fixed area of a web page. A common form of display ads are "banner ads" which typically are displayed at the top of a web page. Text ads, which usually have a fixed and minimal graphic design, and are generally laid out in groups.

One difficulty with display ads is a "real estate" problem associated with them. There can sometimes be a tension between the amount of information that an advertiser wants to communicate and the available space (in pixels) on the web page. Pixels can be a finite resource, and the owners of web sites tend to not give too many pixels of a web page to an advertiser in order to prevent degrading an experience the owners are offering. Closely related to this tension is a "click-barrier" problem. The click barrier problem can arise when a viewer is interested in a product/service being advertised but is hesitant to click on the display ad because of the annoyance of being transition to an entire new web page. Such a web page transition can sometimes lead to the user losing their context of the initial web page.

SUMMARY

Techniques are provided to progressively present an unlimited amount of information to a user within a small finite portion of an electronic document. The real-estate tension within a web page is addressed by making it possible for a display ad to contain an essentially unlimited number of pixels on web page that itself may have a limited amount of pixels. With the availability of an unlimited number of pixels, an advertiser is free to include as much desired information into an advertisement. This feature also helps address the click barrier problem as it allows the user explore the advertisement without having to click the advertisement and be directed to a new page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
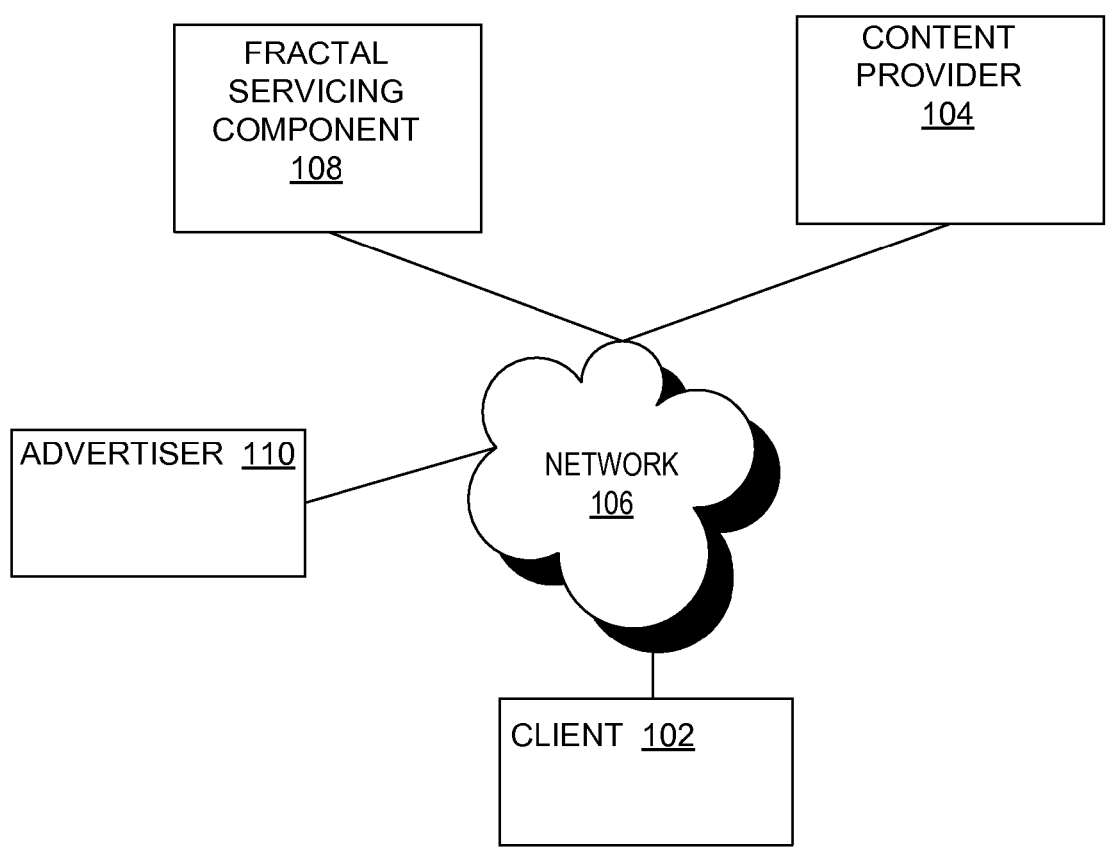
FIG. 1 is a block diagram of an exemplary system for implementing an embodiment of the invention.

FIG. 1 is a block diagram of an exemplary system 100 for implementing an embodiment of the invention. System 100 includes one or more client devices 102, content provider 104, network 106, and fractal servicing component 108. Each client 102 includes a communication interface. The communication interface may be an interface that can allow the client 102 to be directly connected to another client or device or allows the client 102 to be connected to another client or device over communication network 106. Communication network 106 can include, for example, a local area network (LAN), a wide area network (WAN), or the Internet. In an embodiment, the client 102 can be connected to another client or device via a wireless communication interface through the communication network 106.

Client 102 may be or can include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. Client 102 may also be or can include a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform. In an embodiment, one or more aspects of the invention may be implemented with the client 102, content provider 104, and/or the fractal servicing component 108 using compiled unmanaged languages such as C and C++, compiled managed languages such as C# and Java, or using scripting environments such as Javascript and Visual Basic.

Content provider 104 may be or can include a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform. In an embodiment, content provider 104 may be an a computer hardware or software component, such as an application, stored locally on client 102. Content provider 104 is configured to provide a plurality of different types of multimedia content, including video, audio, and text data, to one or more client devices 102. In an embodiment, the content provider 104 can provide the multimedia content in an electronic document. An electronic document may include, but is not limited to, a web page, a Portable Document Format (PDF) document, a word processing document such as Microsoft Word for example, a book, an article, an object in an application, a map, a photograph, an advertisement-supported document, or any other document that can be configured into an electronic format. In an embodiment, the electronic document may be in a multi-resolution file format that includes various layers of additional data.

Fractal servicing component 108 may be or can include a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform. In an embodiment, fractal servicing component 108 may be a computer hardware or software component stored locally on client 102 or on content provider 104. In another embodiment, the fractal servicing component 108 is a content provider 104. Fractal servicing component 108 contains logic that configures it to associate items of additional items of data not seen by a user in a normal or un-zoomed version of a document provided by a content provider 104 with the actual document. The fractal servicing component 108 can store the associated additional items of data with the documents together in a database. The fractal servicing component is also configured to retrieve and provide such documents with associated additional items of data when a request for such documents and/or items of additional data is received by a user. In an embodiment, the request may be received when a user decides to load the electronic document, accesses or selects a designated sub-region of the document within a user interface (UI), or when the user zooms-in or zooms-out of a designated sub-region of the document within the UI.

Generally, the additional data comprises any type of data that may be related or unrelated to content found within the associated document. The additional data may comprise any type of multimedia content. For example, if the document is a research paper, some different types of additional data may include marginal notes, annotations, foot notes, additional pages, citations, any supporting papers, articles, related video or audio content, or other types of related multimedia content.

In an embodiment, the additional data may comprise business data. In an embodiment, the business data comprises data related to the sale or purchase of a good or service. Business data can include, but is not limited to, different types of multimedia content, advertisements, web pages, order forms, instant messengers, photographs, and catalogs. In an embodiment, the items of business data may come from a third-party such as advertiser 110. In such an embodiment, the business data may comprise data related to an advertisement. In another embodiment, the business data may be supplied from content provider 104. In an embodiment, the business data associated with a document is related to a good or service found within the document.

The additional data may be either detailed or active. Detailed additional data comprises additional information, in the form of an image and/or text data, about the good or service that is simply presented at a higher resolution. Active additional data comprises additional information about a good or service that is in an audio or video format. The active additional data may also comprise additional information that a user can interact with by selecting any options within the additional data or inputting data into a user interface (UI) associated with the additional data.

Fractal servicing component 108 may be equipped with or have access to a database that stores a relationship between a document and any items of additional data associated with the document. In an embodiment, the database is located locally on a client 102. In another embodiment, the database is external to both the fractal servicing component 108 and the client 102. The relationship may be, for example, a mapping that details where the additional data is accessible within the document. The fractal servicing component 108 can be used to create an image structure that defines the mapping of where the additional data is accessible within the document.

Figure 2:
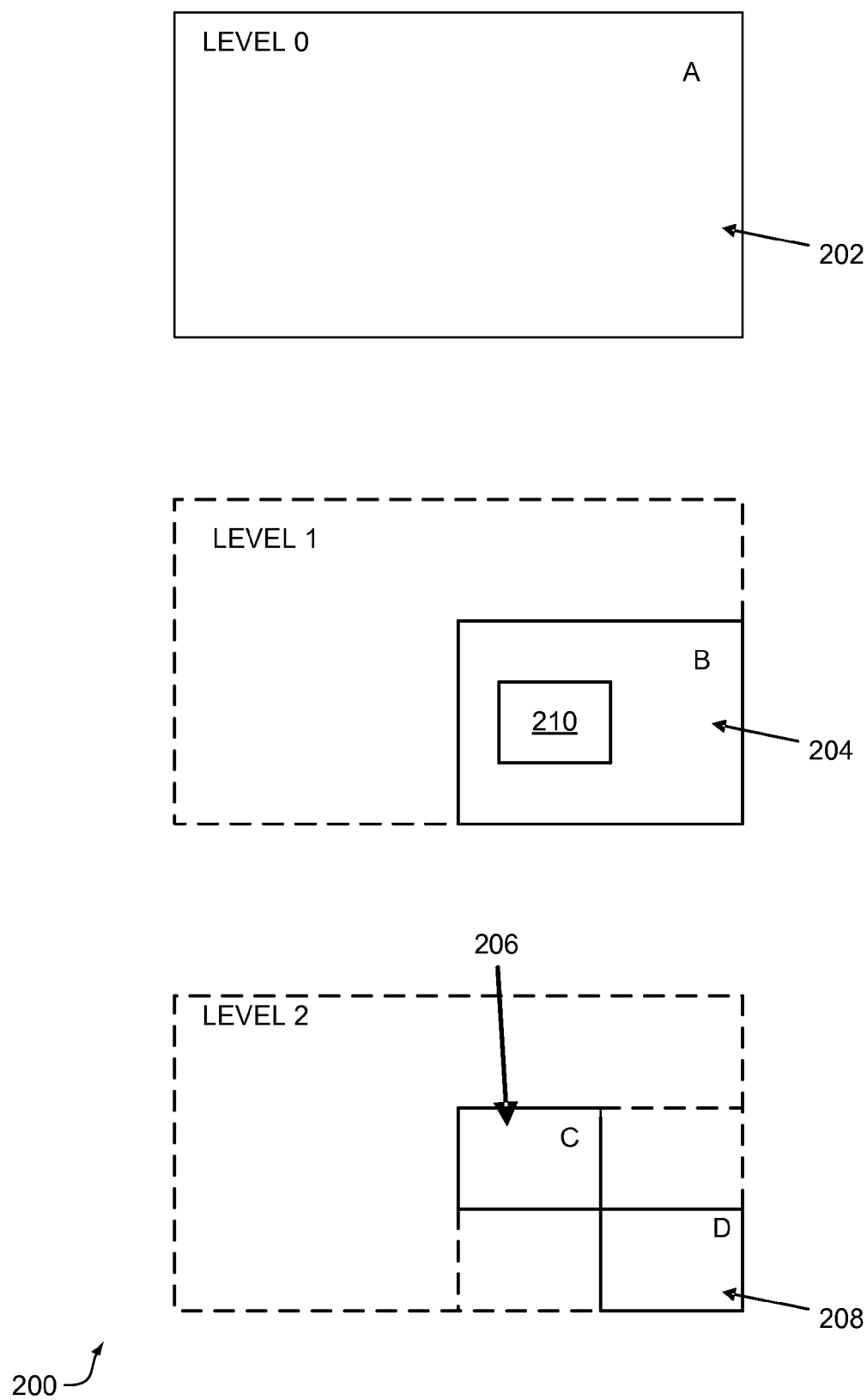
FIG. 2 is a block diagram of an exemplary image structure according to an embodiment of the invention.

FIG. 2 is a block diagram of an exemplary image structure 200 according to an embodiment of the invention. Tile 202 shows that a first Document A will be presented to a user in a normal, non-zoomed-in view. A sub-region 204 of Document A at the lower-right corner can be defined as a location for displaying additional data for Document within the sub-region 204. The additional data can include, for example, one or more items of business data. The items of additional data are associated with the sub-region 204 such that the additional data will be presented in a zoomed-in version of the sub-region 204 when a user zooms-in on sub-region 204. In an embodiment, the zoomed-in version of sub-region 204 with the items of additional data will be displayed on a UI of a client 102 as a separate document (Document B) than Document A. In another embodiment, the zoomed-in version of sub-region 204 is loaded within the same Document A if Document A is in a multi-resolution file format. In an embodiment, the one or more items of additional data of Document B includes at least one item of new information that is not accessible on Document A. In an embodiment, being non-accessible means that the new item was not viewable or selectable on Document A. The new item may be presented in a higher resolution on Document B which makes it easier for or enables a user to view or select the new item of data. In an embodiment, Document B will be loaded from the same database that contains the image structure 200. In another embodiment, Document B can be loaded from a different database than the database that stores the image structure.

The fractal servicing component 108 can also be utilized to further define subsequent sub-regions within a sub-region of an initial document. For example, subsequent sub-regions 206 and 208 can be defined as locations for displaying additional data within sub-region 204 of Document A. In such an example, subsequent sub-regions 206 and 208 are part of Document A if Document A is in a multi-resolution format. In another example, subsequent sub-regions 206 and 208 are considered sub-regions of Document B. In such an example, subsequent sub-regions 206 and 208 are part of Document B if Document B is in a multi-resolution file format. In either event, items of additional data can be associated within the image structure for each of the subsequent sub-regions 206 and 208. As such, the additional data associated with the subsequent sub-region 206 will be presented in a zoomed-in version of the subsequent sub-region 206 when a user zooms-in on the subsequent sub-region 206. Moreover, the additional data associated with subsequent sub-region 208 will be presented in a zoomed-in version of the subsequent sub-region 208 when the user zooms-in on the subsequent sub-region 208.

In an embodiment, the zoomed-in versions of subsequent sub-regions 206 and 208, with their respective items of additional data, are loaded within Document A if Document A is in a multi-resolution file format. In another embodiment, the zoomed-in versions of subsequent sub-regions 206 and 208, with their respective items of additional data, can be loaded within Document B if Document B is in a multi-resolution file format. In yet another embodiment, the zoomed-in versions of subsequent sub-regions 206 and 208, with their respective items of additional data, are loaded as separate documents (Documents C and D respectively) than Documents A and B. In an embodiment, Documents C and D are loaded from the same database that contains the image structure 200. In another embodiment, Documents C and D are loaded from a different database than the database that stores the image structure. In an embodiment, the fractal servicing component 108 can be utilized to define the amount of magnification that is required on a sub-region/subsequent sub-region in order to load the items of additional data.

Typically, the same mechanism used to zoom-in or out of any region of a document can be used to zoom-in or out of a sub-region including additional data. The results differ, however, as zooming-in on a section of a document that does not have additional data loaded from the same document or from a separate document will only produce a magnified representation of the image that is already present within the document. For example, zooming-in on the sections of Documents A and B enclosed by the dashed lines will only result in a magnified representation of an image within those sections being presented to a user. Additional data of a product/service is only loaded from a document when a user zooms-in on sub-region that has been defined and mapped to display additional data or, alternatively, when a user selects a hot spot (which will be discussed shortly).

As one can appreciate, the image structure 200 can be utilize to overcome the problems of the prior art as almost an endless amount of additional data can be associated with an initial document (such as Document A). If one were to continue with the example shown in FIG. 2, one could image that sub-region 206 could have one or more subsequent sub-regions for additional data, and those subsequent sub-regions could additionally have one or more subsequent sub-regions for additional data. Such a pyramid of sub-regions could be configured to grow infinitely or up to any storage capacity restrictions.

Clickable or selectable areas ("hot spots") of the sub-regions of a document, the zoomed-in version of the sub-region, or the additional data within the zoomed-in versions of the sub-regions can also be associated with a document within an image structure. The hot spots can, once selected, cause the additional data to be loaded. For example, referring back to FIG. 2, Document B may include a hot spot 210. Hot spot 210 may have a Uniform Resource Locator (URL) associated with it that can direct a user to any type of multimedia content or that causes a type of multimedia content to be presented to the user. For example, by clicking hot spot 210 with a mouse cursor, a user may be directed to a website of the product/service presented at the hot sport 210, presented with a multimedia player that displays a video related to the product/service, or presented with a Instant Messenger that is connected to a representative of the company associated with product/service. Generally, the user may be presented with detailed or active additional data by selecting the hot spot. In an embodiment, the hot spot is only selectable when a threshold number of pixels of the hot spot occupies a UI displaying the hot spot. The threshold number of pixels may be defined by a user of fractal servicing component 108.

Fractal servicing component 108 can also be configured to dynamically generate an image structure of documents based on a user's actions. Such documents can include documents that a user has viewed or created. For example, an image structure of the web pages browsed by a user can be generated dynamically. In such an example, the fractal servicing component can create a thumbnail image of every web page the user has browsed. The thumbnailed web pages can be grouped together into an image block for every hour of the day. Those blocks for each hour of the day may be grouped together into one block for the entire day. Then each block for an entire day may be grouped together into one block for the entire week, etc. In a zoomed-out version of a image structure, a user may see a map of his/her browsing history across an entire year. In such a map, the user, for example, may not be able to clearly view each individual web page that he/she viewed eight months ago. The image structure for the year's browsing history can have defined sub-regions that allow a user to zoom-in on the different blocks of web pages defined for different months, weeks, days, hours, etc., until the user finally zooms-in on a sub-region that leads to the desired web page. The image structure may be configured to load a representation of the web page as it was eight months ago, or it can be configured to load the web page in its current form. However, the aggregation of web pages is only an example of the types of documents that can be dynamically aggregated into an image structure. Other examples may include, but are not limited to, dynamically creating an image structure of photos taken with a digital camera, items browsed on a merchant's website, and files stored on a hard drive of a computer.

Fractal servicing component 108 can also be configured to monitor a cost metric associated with the manner in which users interact with an advertisement. Traditionally, an advertisement's use or popularity among users may be determined by the number of impressions the advertisement has or the number of times users have clicked or selected the advertisement. However, the invention introduces methods for selecting advertisements without requiring a user to click on an advertisement. Accordingly, a new cost metric for determining the effectiveness of an advertisement needs to be implemented. One such cost metric can be based on the amount of time users spend browsing the advertisement. Another cost metric can be based on the number of pixels of an advertisement that is displayed within a UI. Once the cost metric has been monitored and/or calculated for a predetermined amount of time, the fractal servicing component 108 can report the cost metric to an advertiser or other third-party entity.

Figure 3:
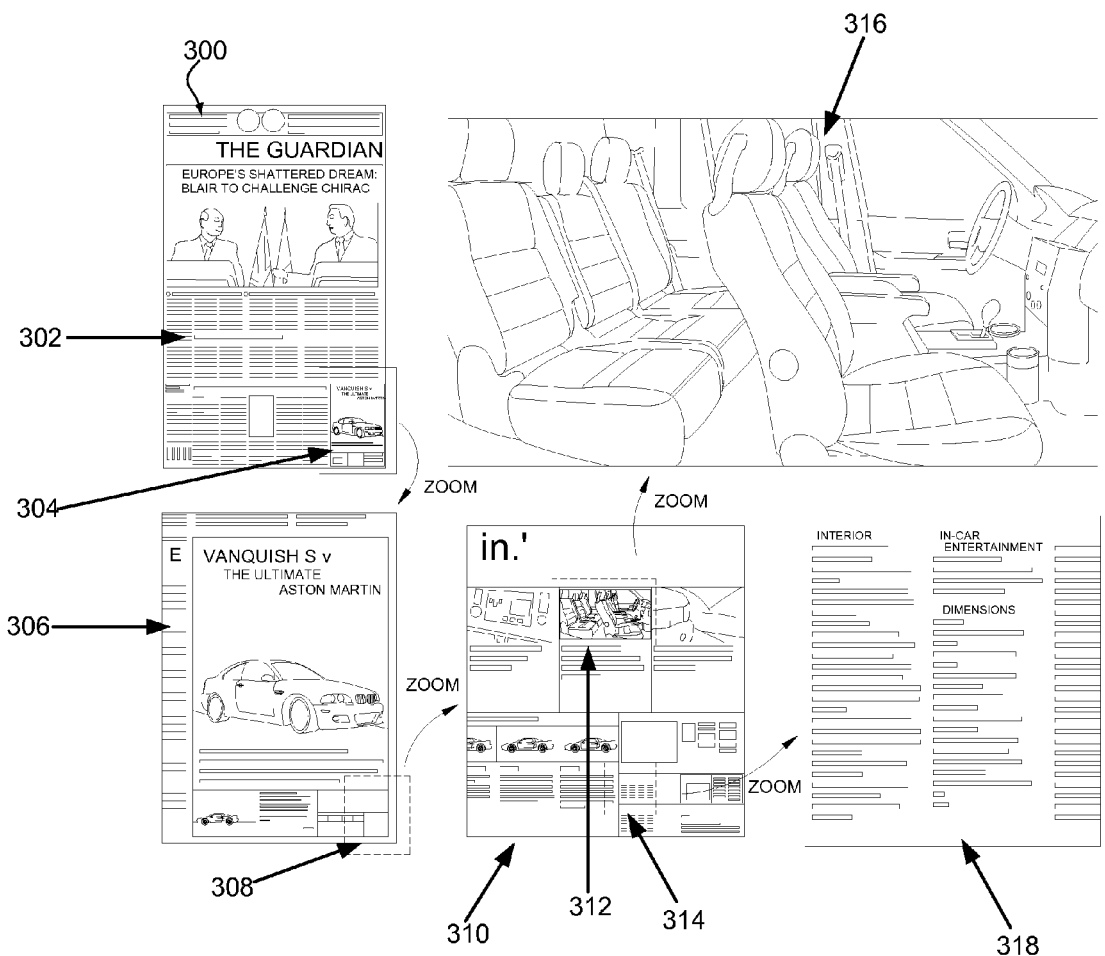
FIG. 3 is an exemplary use of an image structure according to an embodiment of the invention.

FIG. 3 is an exemplary use of an image structure according to an embodiment of the invention. UI 300 displays a image 302 of an electronic copy of a newspaper. In an embodiment, the image 302 may be a web page of the newspaper. As shown, sub-region 304 of the newspaper 302 includes an advertisement for a car. In this example, the sub-region 304 is associated with additional data related to the car within an image structure that can be loaded into the UI 300 if the user zooms-in on sub-region 304. In an embodiment, such additional data is only loaded when the user zooms-in on sub-region 304. In such an embodiment, if the user zooms-in on another region of the newspaper that is not associated with additional data, the user will only be presented with a magnified representation of the image that is already present. For example, if the user zooms-in on a gentleman's face within the newspaper 302, the user will only be presented with an enlarged version of the gentleman's face.

Zooming-in on sub-region 304 causes image 306 to be loaded in the same UI 300. Image 306 is a zoomed-in version of sub-region 304 and includes additional data that may not be accessible in the image 302. Image 306 also includes a subsequent sub-region 308 that is associated with additional data of the car advertisement within the image structure. Image 310, a zoomed-in version of sub-region 308, is loaded into the same UI 300 with various items of additional data when a user zooms-in on subsequent sub-region 308. Image 310 includes a first subsequent sub-region 312 and a second subsequent sub-region 314 that both are associated with additional data within the image structure.

In the example, zooming-in on subsequent sub-region 312 causes image 316 to be loaded into the same UI 300. Image 316 is a zoomed-in version of subsequent sub-region 312 and also includes additional data of the car advertisement. The image 316 may be configured to include a hot spot (not shown) located on one of the seats in the car. For instance, the hot spot, once selected by a user, may cause a separate UI to be displayed on UI 300 that allows a user to toggle between seeing different colors applied to the interior of the car. In an embodiment, the hot spot may only be selectable when a threshold number of pixels of the interior of the car (as shown in image 316) occupies the UI 300. For example, the hot spot on the seat would not be selectable in images 302, 306, or 310 as a threshold number of pixels of the interior of the car that is needed to be displayed has not been reached.

Continuing with the example, zooming-in on subsequent sub-region 314 causes image 318 to be loaded into the same UI 300. Image 318 is a zoomed-in version of subsequent sub-region 314 and also includes additional data of the car advertisement. The image 318 may be configured to include a hot spot (not shown) located on one of the headings of text. The heading of text may include a hyperlink to a web page that causes the web page to be loaded into the UI 300 once the hot spot is selected. In an embodiment, the hot spot may only be selectable when a threshold number of pixels of the text (as shown in image 318) occupies the UI 300. For example, the hot spot on the heading would not be selectable in images 302, 306, or 310 as a threshold number of pixels of the heading that is needed to be displayed has not been reached. The examples of FIG. 3 illustrate an embodiment of a seamless and continuous zooming scheme for displaying additional data on a UI for an electronic document, wherein each additional item of data can be displayed within the same UI without having to open a new UI or window.

Another exemplary use of an image structure can involve electronic, digital maps. A user may zoom-in into a city at a geographical location at a level where small representations of hotels, pushpins for example, may be displayed on the map. As the user zooms-in on a particular pushpin of a hotel, some text associated with the hotel may be loaded into the UI of a client device. Zooming-in further may load an advertisement for the hotel that may include photographs of the hotel. Zooming in even further or selecting a hotspot on a sub-region may cause a webpage of the hotel to be loaded wherein the user can access the hotel's booking system in order to book accommodations at the hotel.

In yet another example, the image structure for additional data can also be applied to digital photographs. For example, an advertiser could pay for an advertisement to be displayed in an photograph. In such an example, a photograph may include a cell phone for which the advertiser wishes to insert an advertisement. The additional data image structure for the photograph can be configured in a manner that causes an advertisement to be loaded within a UI when the user zooms-in on the cell phone at a predetermined zoom level. The additional data image structure may also be configured to provide a UI for ordering the cell phone if the user zooms-in further on the cell phone or selects a hot spot on the UI.

Figure 4:
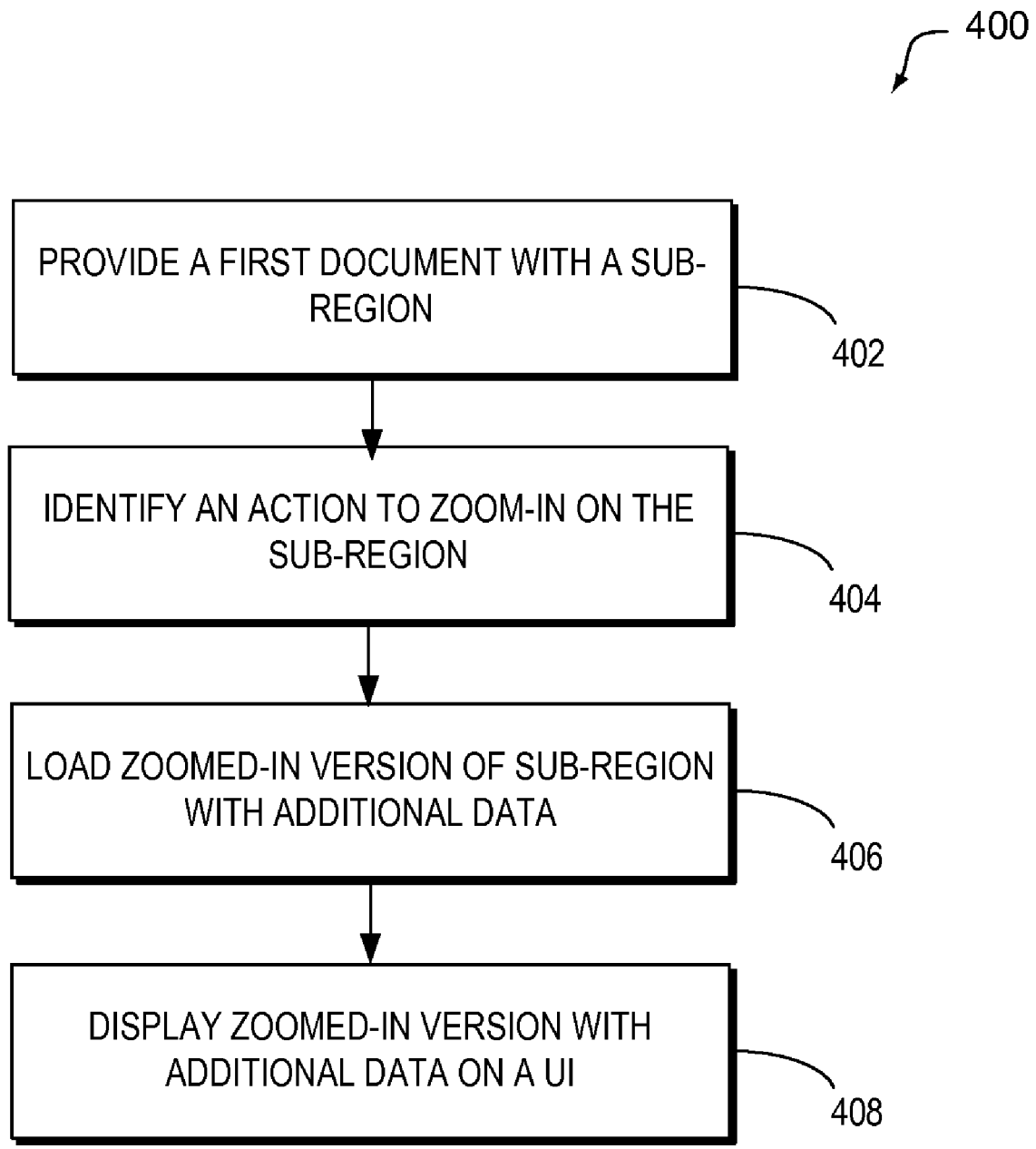
FIG. 4 is a flow diagram of an exemplary method for providing additional data within a document according to an embodiment of the invention.

FIG. 4 is a flow diagram of an exemplary method 400 for providing additional data within a document according to an embodiment of the invention. At operation 402, a first document with sub-region is provided on a user interface. In an embodiment, the sub-region is associated with additional data. At operation 404, an action to zoom-in on the sub-region is identified. In an embodiment, the action is identified by a fractal servicing component 108. At operation 406, a zoomed-in version of the sub-region that includes the additional data is loaded when the action is identified. In an embodiment, the additional data includes at least one item of new information that is not accessible on the first document. At operation 408, the zoomed-in version of the sub-region with the additional items is displayed on the user interface. In an embodiment, the zoomed-in version of the sub-region is a separate document than the first document. In another embodiment, the zoomed-in version of the sub-region is loaded as part of the first document if the first document is in a multi-resolution file format.

Figure 5:
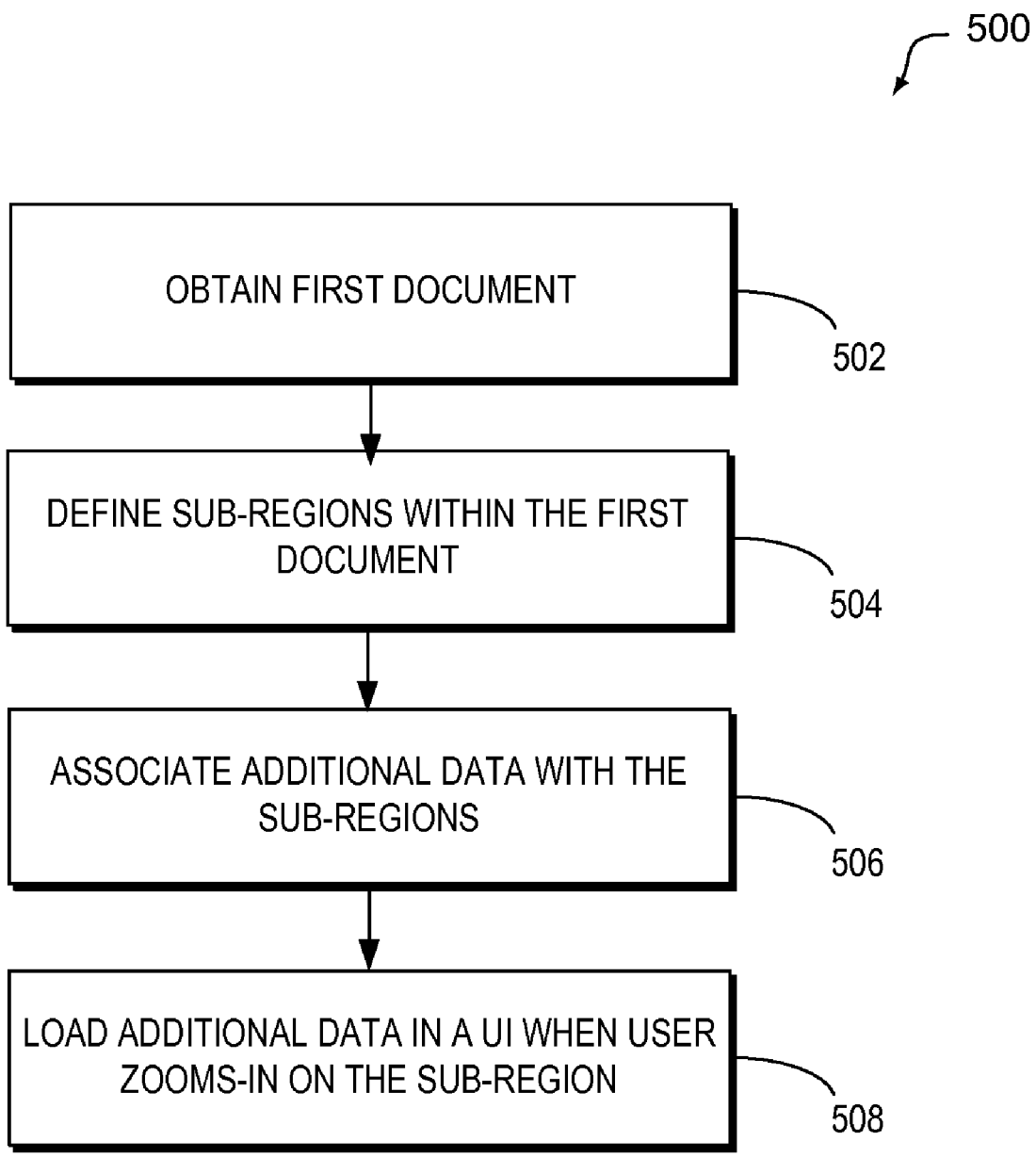
FIG. 5 is a flow diagram of another exemplary method for providing additional within a document according to an embodiment of the invention.

FIG. 5 is a flow diagram of another exemplary method 500 for providing additional data within a document according to an embodiment of the invention. At operation 502, a first document is obtained. A document may be an electronic document. Such electronic documents may include, but are not limited to a web page, a Portable Document Format (PDF) document, a word processing document such as Microsoft Word for example, a book, an article, an object in an application, a map, a photograph, an advertisement-supported document, or any other document that can be configured into an electronic format. At operation 504, one or more sub-regions are defined within the document. In an embodiment, the sub-regions may be defined using a fractal servicing component 108. At operation 506, additional data is associated with the one or more sub-regions. In an embodiment, the additional data and the sub-regions are associated together in an image structure. In an embodiment, the additional data is stored on a separate document than the first document. In another embodiment, the additional data is stored within the first document if the first document is in a multi-resolution file format. At operation 508, the separate document of additional data is loaded onto a user interface when a user zooms-in on the sub-region on the user interface.

Figure 6:
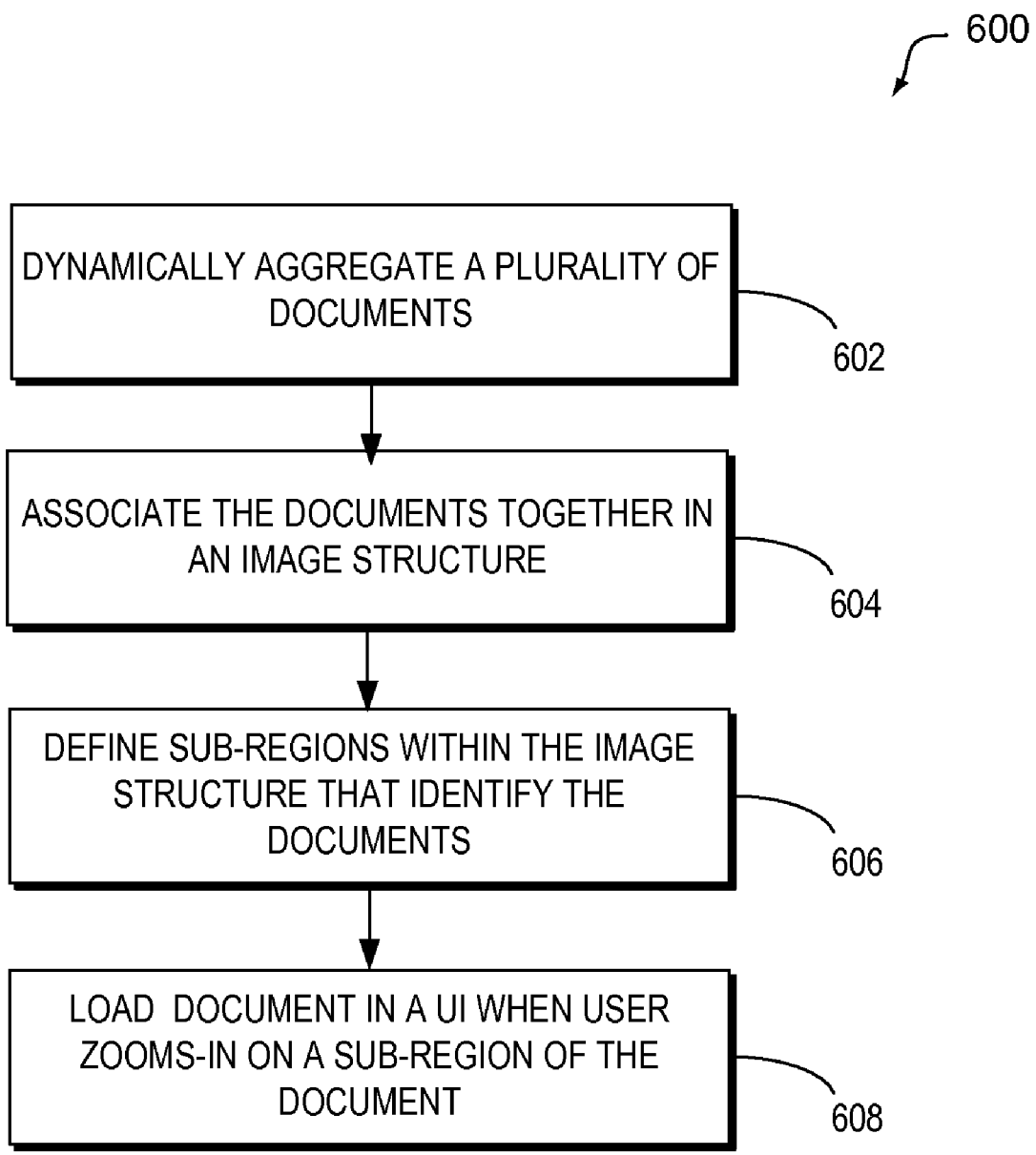
FIG. 6 is a flow diagram of an exemplary method for providing documents associated within a dynamically created image structure according to an embodiment of the invention.

FIG. 6 is a flow diagram of an exemplary method 600 for providing documents associated within a dynamically created image structure according to an embodiment of the invention. At operation 602, a plurality of documents are dynamically aggregated as a user views or creates the plurality of documents. Such documents may include, but are not limited to, a web page, a PDF document, a word processing document such as Microsoft Word for example, a book, an article, an object in an application, a map, a photograph, an advertisement-supported document, or any other document that can be configured into an electronic format. At operation 604, the plurality of documents are associated together in an image structure. In an embodiment, the documents are associated and/or grouped together based on when the documents were created or viewed. At operation 606, sub-regions are defined within the image structure that identify documents within the plurality of documents. In an embodiment, at least one document is stored in a separate file than another document. At operation 608, the separate file of the at least one document is loaded onto a user interface when a user zooms-in on a sub-region of the at least one document.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. One or more computer-storage media having computer-usable instructions stored thereon, that when executed by a computing system having a processor and memory, cause the computing system to perform a method for providing additional data within a document, the method comprising:
    (a) providing a first document with at least one sub-region comprised of data in a first file type on a user interface, wherein the at least one sub-region is associated with one or more items of additional data in a second file type that is different from the first file type;
    (b) identifying an action to zoom-in on the at least one sub-region;
    (c) loading a zoomed-in version of the at least one sub-region that is comprised of the one or more items of additional data of the second file type when the action is identified, wherein the one or more items of additional data in the second file type replace the data of the first file type within the at least one sub-region;
    (d) displaying the zoomed-in version of the at least one sub-region with the one or more items of additional data of the second file type on the user interface; and
    (e) monitoring a cost metric that includes at least one from the following:
        (1) monitoring an amount of time a user spends browsing the one or more items of additional data of the second file type, or
        (2) monitoring an amount of pixels of the one or more items of additional data of the second file type displayed in the user interface.

2. The media according to claim 1, wherein the one or more additional items are loaded from at least one of a server and a local client device.

3. The media according to claim 1, the method further comprising:
    identifying one or more subsequent sub-regions on a sub-region; and
    repeating steps (b) through (d) for the identified subsequent sub-regions, wherein the sub-region is the first document and the one or more subsequent sub-regions is the at least one sub-region.

4. The media according to claim 1, wherein the one or more items of additional data comprise one or more types of multimedia content.

5. The media according to claim 1, wherein the zoomed-in version of the sub-region includes at least one selectable area that loads additional data when selected.

6. The media according to claim 5, wherein the selectable area is only selectable when a threshold number of pixels of the selectable area occupies the user interface.

7. The media according to claim 5, wherein the additional data comprises active data.

8. The media according to claim 1, wherein the one or more items of additional data comprise advertisement data.

9. The media according to claim 1, wherein monitoring the cost metric includes monitoring both the amount of time the user spends browsing the one or more items of additional data and the amount of pixels of the one or more items of additional data displayed in the user interface.

10. The media according to claim 1, the method further comprising reporting the cost metric to one or more advertisers.

11. One or more computer-storage media having computer-usable instructions stored thereon, that when executed by a computing system having a processor and memory, cause the computing system to perform a method for providing additional data within a document, the method comprising:
    obtaining a first document in a first file type;
    defining one or more sub-regions within the first document;
    associating one or more items of additional data in a second file type, which is different from the first file type, with the one or more sub-regions;
    loading the one or more items of additional data in the second file type onto a user interface when a user zooms-in on the one or more sub-regions of the first document in the first file type on the user interface; and
    monitoring a cost metric that includes at least one from the following:
        (1) monitoring an amount of time a user spends browsing the one or more items of additional data of the second file type, or
        (2) monitoring an amount of pixels of the one or more items of additional data of the second file type displayed in the user interface.

12. The media according to claim 11, the method further comprising:
  defining one or more subsequent sub-regions within a sub-region; and
  associating at least one item of additional data with the one or more subsequent sub-regions, wherein the at least one item of additional data is stored on a distinct document than a document of the sub-region.

13. The media according to claim 12, the method further comprising loading the distinct document of the at least one item of additional data onto the user interface when the user zooms-in on the one or more subsequent sub-regions.

14. The media according to claim 11, the method further comprising associating at least one selectable area with the one or more sub-regions, wherein the at least one selectable area loads additional data when selected on the user interface.

15. The media according to claim 14, wherein the selectable area is only selectable when a threshold number of pixels of the selectable area occupies the user interface.

16. One or more computer-storage media having computer-usable instructions stored thereon, that when executed by a computing system having a processor and memory, cause the computing system to perform a method for providing documents associated within a dynamically created image structure, the method comprising:
  dynamically aggregating a plurality documents of a first file type as a user views or creates the plurality of documents;
  associating representations of the plurality of documents together in an image structure of a second file type based on when the plurality of documents were viewed or created;
  defining one or more sub-regions within the image structure of the second file type that identify a representation of a document of the plurality of documents of the first file type; and
  loading the at least one document as the first file type onto a user interface when a user zooms-in on a sub-region within the image structure of the second file type of the at least one document.

17. The media according to claim 16, wherein the plurality of documents are related to a user's web browsing history.

18. The media according to claim 16, the method further comprising associating at least one selectable area with the one or more sub-regions, wherein the at least one selectable area loads data related to at least one of the plurality of documents when selected on the user interface.

19. The media according to claim 18, wherein the selectable area is only selectable when a threshold number of pixels of the selectable area occupies the user interface.

\* \* \* \* \*